June 7, 1932.  C. S. PRESTON  1,862,160

TIRE VALVE INSERT

Filed Nov. 8, 1928

INVENTOR.
CLARENCE S. PRESTON
BY A. B. Bowman
ATTORNEY

Patented June 7, 1932

1,862,160

UNITED STATES PATENT OFFICE

CLARENCE S. PRESTON, OF SAN DIEGO, CALIFORNIA

TIRE VALVE INSERT

Application filed November 8, 1928. Serial No. 317,926.

The present invention relates to tire valve inserts or cores for use in conventional or well known present types of tire valve bodies, and it has for its principal object the provision of a tire valve core of improved efficiency and durability.

The invention has for another of its objects the provision of a tire valve in which a valve member is movable outwardly of a valve body toward a seat with which it coacts to prevent escape of air from the inflated tire. Valves of this type have been employed heretofore but they have invariably been costly and inefficient, and particularly impractical in many cases, as they either add to the length or to the diameter of the present standard sizes of tire valve bodies.

It is therefore another object of the present invention to provide a tire valve core which may be inserted in common types of tire valve bodies without increasing the length or diameter of the usual complete assembly, and, without causing the user to depart from standard and commonly employed methods of installing, removing and testing.

By far the great majority of tire valve bodies now in use are substantially similar as to the dimensions of the internal cavities which receive the tire valve, and they are also all designed to be suited for inflation by highly standardized inflating devices. Therefore, in order to be practical, a tire valve insert must meet all standard conditions and be fully operative in connection with standard equipment which is now so extensively used.

In meeting the existing demand for a more efficient valve core, I provide a small core body and valve assembly which can be inserted in the internally threaded bore of a valve body in air tight relationship thereto, so that no fixed part of the assembly projects beyond the outer end of the valve body to interfere with commonly employed dust caps, air pumps, filling hoses and the like, and so that the usual over-all dimensions of the complete tire valve assembly are not altered.

Another object of my invention is to provide an all metal construction in which easily fatigued and deformable substances, such as rubber, for example, are entirely dispensed with.

Another object of the invention is to provide a complete assembly of valve body, valve core and protecting top closure for the valve body, all of which may remain in assembly while the tire and tube are being removed from or installed upon a rim.

Another object of the invention is to provide an insert with special lug and notch means thereby increasing the strength to provide for better securing the insert in the body and releasing the same.

Many other objects and advantages of my invention will appear hereinafter.

I have illustrated my invention by the accompanying drawing in which:—

Figure 2:
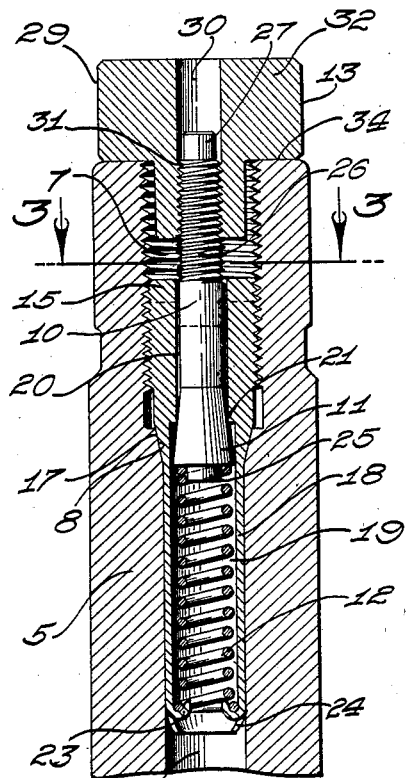
Figure 2 is a view in vertical section thereof, and showing in connection therewith a conventional tire valve body.
Figure 1:
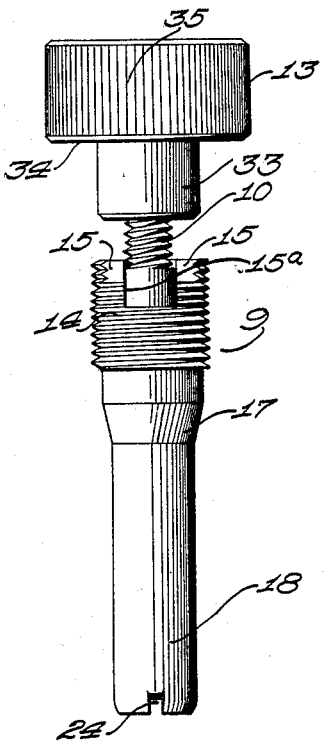
Figure 1 is a side elevational view of my tire valve insert.
Figure 3:
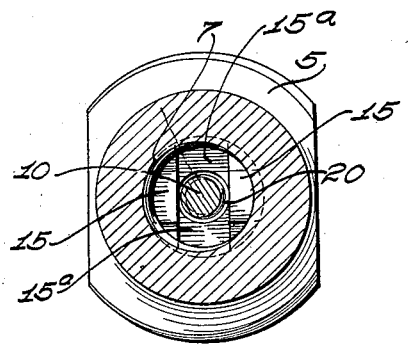
Figure 3 is a view in transverse section through 3—3 of Fig. 2.

More specifically, 5 indicates a conventional tire valve body, such as is employed in the great majority of pneumatic tires and devices now in common use. Usually such valve bodies are externally threaded for purposes well known, but inasmuch as no external threads are required to carry out my invention, and for the purpose of avoiding confusion in the description to follow, I have not illustrated any external threads.

The valve body 5 is provided with a lower or inner air course 6 continuing through the body from end to end. This course at the outer end is sufficiently enlarged to form the internally threaded bore 7 which opens at the outer end of the valve body. Intermediate of the internally threaded bore 7 and the inner portion of the air course 6 there is provided a tapered seat 8 in decreasing diameter inwardly. Said seat is provided in all standard valve bodies of the type shown and provides a seat for the common types of valve cores (not shown). This seat in conjunction with the usual tire valve bodies becomes inefficient after a common type of tire valve core has been employed in and removed therefrom, inasmuch as said seat tends to retain particles of rubber from the removed core. Such retained particles often make it difficult to properly seat and seal a new core body. It will be apparent hereinafter that my improved core body is better adapted for use on such seat after a common type of core has been removed.

My improved core body is preferably made entirely of metal and comprises a shell or body generally indicated by the numeral 9, a valve member comprising an integral stem 10 and plug 11, a spring 12 for retaining the valve in proper position, and a nut 13 for cooperation with the valve body 5 to provide for positively seating and unseating the valve plug 11. The core body 9 is a single piece of metal without rubber or other gaskets or the like, and the valve plug 11 and stem 10 are made from a single piece of metal without addition of rubber or other similar parts.

The outer portion of the core body is externally threaded, as at 14, and is provided with outwardly projecting lugs 15 at its upper end in the conventional manner but is also provided with transverse slots 15a in which a conforming wrench may be used thus providing greater strength for securing and releasing the insert 9 in the tire valve body. The threaded part provides for the core body being screw threaded into the bore 6 of the valve body 5 until it is disposed entirely within the valve body 5 and well inwardly of the outer end thereof as shown.

Immediately below the threaded portion of the core body the said body decreases in diameter inwardly to provide a metal seating surface 17 adapted to effectively seat on the seat 8 of the valve body 5 to prevent flow of air between surface 17 and the said seat 8. By employing a substantial metal seating surface, such as 17 and the added slot 15a, it is possible to force the seating surface 17 into positive and air tight relationship to the seat 8 in spite of the existence of foreign particles of rubber or the like which may have adhered to the seat from previous use of a rubber seating member.

Inwardly of the seating surface 17 the core body is formed with a tubular extension or spring housing 18, which is of reduced diameter so as to extend into the air course 6, of the valve body, without binding and without interfering with the proper location and seating of the core body. Said housing provides a central air course 19 in which the loosely coiled spring 12 is housed. Said spring is of slightly reduced diameter so that it may work freely in the air course 19 and at no time obstruct passage of air through the air course 19. From the air course 19 a smaller air course 20 continues outwardly through the core body so that said core body is of tubular form and open from end to end for the passage of air. At the juncture of air courses 19 and 20, a valve seat 21 is provided. The valve plug 11 is disposed partially in air course 20 and partially in course 19 so that by slight movement it may be caused to become seated or unseated, as the case may be, to control or to prevent, as the case may be, flow of air through the courses 19 and 20, respectively.

The spring is held within the spring housing 18 by means of inturned fingers 23, which are cut from the metal, as at 24, and bent back into the air course 19. The lower end of the valve plug 11 is formed with a small diametered extension 25 around which the upper end of the spring is frictionally fitted. The spring tends at all times to hold the valve seated. The lower end of the housing 18 is slightly rounded for easy insertion in a valve body.

The plug 11 is of smaller diameter than that of the air course 19 so that air may freely pass the valve when unseated. Likewise the valve stem 10 is of small diameter as compared with the outer air in which it is disposed so that the air may flow through the said outer air course around the stem. In conformity with a salient feature of my invention, the stem 10 is externally threaded, as at 26. The threads terminate short of the outer end of the stem to leave a smooth unthreaded portion 27 which is reduced in diameter to at least the diameter of the root of the threads 26.

When the core body just described is inserted in valve body 5, the seating surface of the core body comes into air tight engagement with the seat provided in the valve body. When the core body is installed, air can flow through the valve body only by way of the air course in the core body, so that all air entering or leaving the valve body is controlled by the valve plug 11. Normally the spring coacts with the valve plug 11 to prevent return flow of air unless the valve plug is held unseated by some exterior force, as in the case of testing for pressure. To provide for unseating the valve when desired, by means other than by inflowing air, the stem 10 is of such length as to protrude slightly beyond the upper open end of the valve body when the core body is properly installed and seated. Thus the outer unthreaded end of the stem 10 protrudes from the valve body, but the threads of the stem 10 are so disposed that they cannot come into contact with a filling hose or the like (not shown), and so they are protected against damage.

In conformity with another salient feature of my invention, I provide a nut 29, having a central through aperture 30. This aperture is threaded at the inner end with threads 31 of which a short outer portion thereof is devoid of threads. The nut consists of a head 32 and a reduced inner shank 33. The diameter of the shank is less than the major diameter of the core body so that the shank will be a loose fit in any valve body into which the core body is screw threaded. The head 32, where it joins the shank 33, is provided with a flat or horizontal inner surface 34, adapted to rest on the extreme outer end of the valve body 5, and further adapted for laterally sliding movement across the outer end of the valve body for a purpose which will be apparent hereinafter. Accordingly the head is appreciably larger than the core body itself and is suitably prepared, as by knurling at 35, to provide for its being suitably engaged by the fingers, or by any suitable tool.

By means of the lugs on the core body; said core body is inserted within a valve body, such as 5, in the usual manner. It is forcibly seated on the internal seat of the valve body, and while tests may show that it still leaks, due to foreign particles of rubber or the like, it will be found that successive seating and unseating will remove the foreign particles until the core body forms an air tight union with the valve body. Now the core body with its nonreturn valve will normally prevent escape of air from the valve body. When the core body is so installed, it is well within the bore of the valve body, and its extreme outer end, as represented by the lugs thereof, is disposed well below the outer open end of the valve body and in such position that no outer object, or even the nut 29 can come in contact with it.

The spring holds the valve to its seat but this spring is not depended upon entirely for this purpose. To forcibly seat the valve, and to hold it securely seated at all times when desired, the nut 29 is screw threaded inwardly of the stem 10 until its inner surface 34 abuts the outer end of the valve body. Further slight advanced screw threaded movement of the nut on the stem 10 lifts the plug valve 11 very positively against its seat and draws it into the seat so tightly as to hold it there at all times until it is desired to release it. Releasing is accomplished in the following manner:—The nut is unscrewed slightly until it is raised out of contact with the outer end of the valve body. A slight blow struck inwardly on the nut will then depress the stem 10 and plug 11 and so unseat the plug. Then, by removing the nut, the tire (not shown) to which the valve body is connected may be tested for pressure or inflated in the customary manner. Immediately inflation is complete the spring will seat the valve and hold same seated to prevent appreciable loss of air until the nut is employed to more positively seat the valve.

Many causes, such as inaccuracies in the valve body may result in the necessity of the valve stem 10 being inclined slightly relative to the valve body in order for the plug 11 to seat properly. Likewise, the stem 10 might become bent so that when the valve plug 11 is concentric with the valve body and with its seat, the upper end of the stem would not be concentric with the outer end of the valve body, however, the smooth under surface 34 of the nut provides for the nut adjusting itself laterally of the valve body irrespective of how the stem 10 may be aligned with other parts, and this provision I find to be particularly advantageous and practical in insuring proper and positive seating of the valve plug.

It will be apparent now that I have provided a very simple and practical all metal insert or core for tire valve bodies; which core is adapted for the immediate insertion in practically any of all standard tire valve bodies now in such extensive use, and while I have shown and described a specific embodiment of my invention, I do not limit myself to any specific construction of arrangement of parts and I may employ any construction or arrangement of parts, coming within the scope of the appended claims, without departing from the scope of my invention.

Having thus described my invention, what I claim as new and desire to secure by Letters Patent is:

1. In a device of the class described, the combination with a rigid, metallic valve body which is open from end to end and providing a bore having internal threads adjacent the outer end of the body and providing a tapered, metallic seating surface inwardly of the threads, of a tubular core body provided with external threads adjacent its outer end and further provided with an internal valve seat, said core body being screw threaded into said valve body so that its outer end is disposed some distance inwardly of the threaded bore of said valve body and in air tight engagement with said seating surface, a tapered valve member disposed inwardly of said seat and movable outwardly into air tight connection with said valve seat, a threaded stem on said valve member and a nut screw threaded on said stem and shiftable laterally on the outer end of said valve body.

2. In a device of the class described, the combination with a rigid, metallic valve body which is open from end to end and providing a bore having internal threads adjacent the outer end of the body and providing a tapered metallic seating surface inwardly of the threads, of a tubular core body provided with external threads adjacent its outer end and further provided with an internal valve seat, said core body being screw threaded into said valve body so that its outer end is disposed some distance inwardly of the threaded bore of said valve body and in air tight engagement with said seating surface, a tapered valve member disposed inwardly of said seat and movable outwardly into air tight connection with said valve seat, a threaded stem on said valve member, a nut screw threaded on said stem and shiftable laterally on the outer end of said valve body, and a spring in said core body engaging said valve member and tending to hold it in engagement with its seat.

3. In a device of the class described, the combination with a rigid, metallic valve body which is open from end to end and providing a bore having internal threads adjacent the outer ends of the body and providing a tapered, metallic seating surface inwardly of the threads, and a restricted cylindrical bore inwardly of said seating, of a tubular core body provided with external threads adjacent its outer end and further provided with an internal valve seat, said core body being screw threaded into said valve body so that its outer end is disposed some distance inwardly of the threaded bore of said valve body and in air tight engagement with said seating surface, a tapered metallic valve member disposed inwardly of said seat and movable outwardly into air tight connection with said valve seat, a threaded stem on said valve member, a nut screw threaded on said stem and shiftable laterally on the outer end of said valve body, a spring in said valve body engaging said valve body and tending to hold it in engagement with its seat, and a housing integral with said core body enclosing said spring and supporting it in engagement with said valve member, said housing forming a snug fit in said restricted bore.

4. In a device of the class described, the combination with a rigid metallic valve body which is open from end to end and providing a bore having internal threads adjacent the outer end of the body and providing a tapered, metallic seat surface inwardly of the threads, of a core body with a central bore of a larger and smaller diameter and provided externally with a tapered, metallic seat adapted to fit the metallic seat in said valve body, and provided internally with a valve seat formed by the juncture of said bores, a relatively long tapered, metallic valve member extending through said seat and engageable intermediate its ends with said valve seat, said valve member provided with a stem integral therewith extending outwardly of said core body, and provided with threads at its outer end, and a nut engageable with said valve stem and with the outer end of said valve body and shiftable laterally on the end of said valve body for tightening said valve in its seat.

5. In a device of the class described, a core body provided at its outer end with spaced outwardly projecting lugs and with notches at right angles thereto passing through said lugs forming double notches in the outer end thereof at right angles to each other and the one deeper than the other.

In testimony whereof, I have hereunto set my hand at San Diego, California, this 2nd day of November, 1928.

CLARENCE S. PRESTON.